United States Patent [19]

Goto

[11] Patent Number: 4,639,906
[45] Date of Patent: Jan. 27, 1987

[54] MAGNETIC RECORDING ON TRACKING CONTROLLED GROOVELESS MEDIUM HAVING MAGNETIC AND CAPACITANCE PROPERTIES

[75] Inventor: Kunio Goto, Yokohama, Japan

[73] Assignee: Victor Company of Japan, Limited, Japan

[21] Appl. No.: 367,033

[22] Filed: Apr. 7, 1982

[30] Foreign Application Priority Data

Apr. 7, 1981 [JP] Japan .................... 56-51957

[51] Int. Cl.$^4$ .................... G11B 13/00; G11B 21/10
[52] U.S. Cl. .................... 369/14; 360/75; 360/77; 360/110; 369/43
[58] Field of Search .................... 360/77, 78, 135, 75, 360/110, 103, 102; 369/13, 14, 32, 41, 43, 33, 126; 428/694, 900, 64, 65

[56] References Cited

U.S. PATENT DOCUMENTS

| 3,886,052 | 5/1975 | Smith | 360/135 |
|---|---|---|---|
| 4,160,268 | 7/1979 | Goto et al. | 360/77 |
| 4,190,859 | 2/1980 | Kinjo | 360/77 |
| 4,322,836 | 3/1982 | Kinjo et al. | 360/77 |
| 4,420,827 | 12/1983 | Wada et al. | 360/77 |
| 4,448,843 | 5/1984 | Yamada et al. | 360/135 |

FOREIGN PATENT DOCUMENTS

| 2354506 | 5/1975 | Fed. Rep. of Germany . | |
| 2715573 | 10/1977 | Fed. Rep. of Germany . | |
| 54-143111 | 8/1979 | Japan . | |
| 56-117346 | 9/1981 | Japan | 360/135 |
| 850895 | 10/1960 | United Kingdom | 360/74.7 |
| 1230052 | 4/1971 | United Kingdom | 360/77 |
| 2046480 | 11/1980 | United Kingdom | 360/77 |

OTHER PUBLICATIONS

IBM TDB, vol. 21, No. 10, Floppy Disc Embossing For Servo Applications, Acosta et al., Mar. 1979, pp. 4259-4260.
IBM TDB, vol. 19, No. 9, Optical or Capacitive Digital Servos for Record Members, Cannon, Feb. 1977, pp. 3303-3304.
IBM TDB, vol. 21, No. 6, Nov. 1978, R. I. Potter, "Capacitive Servoing on Topographic Variations".
IBM TDB, vol. 21, No. 3, Aug. 1980, Handen et al., "Improvement in the Position Error Signal Detector Channel for a Buried Servo Recording System".
RCA TN 1210, Jul. 1978, "Microwave Apparatus to Detect Small Capacitance Changes at 2.45 GHz".

Primary Examiner—Raymond F. Cardillo
Assistant Examiner—Steven R. Garland
Attorney, Agent, or Firm—Lowe, Price, LeBlanc, Becker & Shur

[57] ABSTRACT

The lateral position of a magnetic head is controlled in response to tracking information derived from an adjacent guide track formed by a series of minute pits on a grooveless recording medium having ferromagnetic and dielectric properties. Microwave energy is applied to an electrode mounted for movement with the magnetic head to sense the variations in capacitance resulting from the geometrical variations of the minute pits. The recording medium comprises an underlying layer of ferromagnetic material in which the minute pits are formed in spiral or concentric pattern and an overlying layer of a dielectric material which conforms to the pit contours of the underlying layer.

7 Claims, 7 Drawings

MAGNETIC RECORDING ON TRACKING CONTROLLED GROOVELESS MEDIUM HAVING MAGNETIC AND CAPACITANCE PROPERTIES

BACKGROUND OF THE INVENTION

The present invention relates generally to magnetic recording and/or reproduction, and in particular to magnetic recording on a medium having combined ferromagnetic and dielectric properties on which is provided a prerecorded pattern of capacitively detectable minute pits as a grooveless guide for controlling the track of magnetically recorded signals.

Magnetic recording has been in extensive use because of its advantages over other recording systems in versatility in recording, reading and erasing functions. Various forms of recording medium such as tape, sheet, disk and drum are now available to utilize the capabilities of magnetic recording to the fullest extent. In particular high-density recording is desired for video or digitalized audio signals.

Disks and drums are suitable media for high density magnetic recording since information can be recorded along successively arranged narrow tracks. In the past, a grooved magnetic recording medium has been developed in which the magnetic head is guided along the grooved magnetic recording track.

Various shortcomings are inherent in the grooved approach. One such shortcoming is the contact wear that exists when the magnetic head makes contact with the inner walls of the guide, resulting in a short usable lifetime. Although this shortcoming could be avoided by narrowing the width of the magnetic head while increasing its length, the magnetic head tends to wear the surface of the grooved track.

In another type of grooved magnetic recording system, the magnetic head is mounted on a forked end of a moving arm and a tracing guide follower is mounted on the other end of the fork. Guide follower engages grooved guide formed on the outer area of a magnetic recording disk and the magnetic head makes contact with a recording medium located in the inner area of the disk. A shortcoming of this type of grooved approach is the difficulty to maintain the distance between the magnetic head and guide follower constant over the range of movement between the innermost and outermost grooves.

Furthermore, it has been recognized that the grooved prior art systems fail to meet the various requirements imposed on video recording. One particular requirement is to slide the recording head over several tracks to obtain motionless or slow-motion pictures.

SUMMARY OF THE INVENTION

The present invention eliminates the prior art problems by forming a series of minute pits along a guide track on a recording medium having ferromagnetic and dielectric properties, the minute pits being detected capacitively to generate a tracking signal for guiding a magnetic head along a magnetic recording track located parallel with the guide track.

Figure 2:
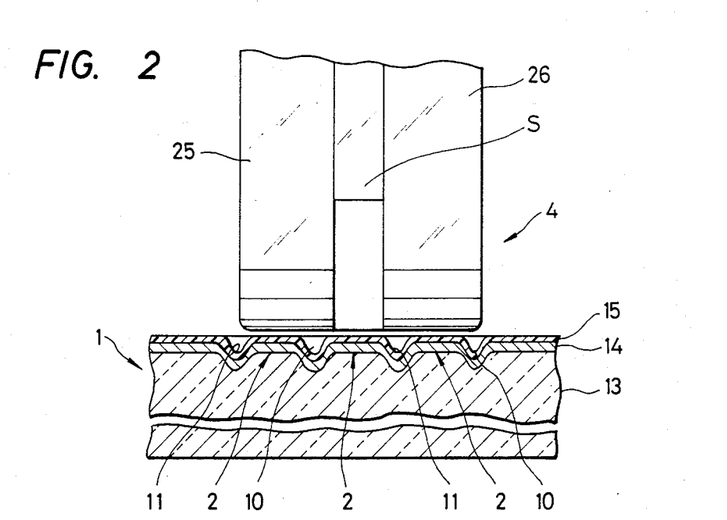
FIG. 2 is a partial cross-sectional view of the recording sheet disk of FIG. 1 with a pickup head being positioned on a given recording track.

According to a first aspect of the invention, there is provided a recording medium which comprises an underlying layer of a ferromagnetic conductive material formed with a series of minute pits along a guide track, and an overlying layer of a dielectric material. As seen in FIG. 2, the overlying layer conforms to the pit contours of the underlying layer.

According to a second aspect of the present invention, there is provided a pickup head for use with a recording medium having a series of minute pits along a predetermined guide track and a magnetic recording track parallel with said guide track. The pickup head comprises an electrode, means for coupling said electrode to a capacitance detection circuit, an electromagnetic transducer, means for coupling the transducer to an external utilization circuit, and a wear resistant insulative support for supporting the electrode and the transducer in side-by-side relationship so that they are aligned with each of the magnetic recording tracks while making contact with the surface of the recording medium.

According to a third aspect of the invention, there is provided a system for recording signals on a recording medium having a series of minute pits along a guide track and a magnetic recording track parallel with the guide track, comprising, means for moving the recording medium, a pickup head comprising an electrode, an electromagnetic transducer, and a wear resistant insulative support for supporting the electrode and transducer in side-by-side relationship so that they are aligned with the magnetic recording track while making contact with the surface of the recording medium, means for supplying ultrahigh frequency energy to the electrode and modulating the UHF energy with capacitance variations which occur between the electrode and the recording medium at a rate corresponding to the rate of occurrence of the minute pits, means for generating an error signal in response to the modulated UHF energy, and means for controlling the position of the pickup head laterally with respect to the guide track in response to the error signal.

According to a fourth aspect of the invention, there is provided a method for controlling the lateral position of an electromagnetic transducer along a predetermined track of a recording medium having an overlying layer of a dielectric material and an underlying layer of a ferromagnetic conductive layer, comprising the steps of forming a series of minute pits along a guide track parallel with the predetermined track on the surface of the ferromagnetic conductive layer, sensing the minute pits and generating therefrom a tracking control signal, and moving the transducer laterally with respect to the guide track in response to the tracking control signal.

Various forms of tracking pattern can be conceived to meet particular applications. Spiral or concentric pattern of minute pits may be formed on a thin sheet of disk which spins at a considerably high speed, typically, 1800 rpm.

Preferably the spiral tracking pattern consists of alternate part-spiral sections with the minute pits of each section occurring at different rate from the rate of occurrence of those on the other section. A pair of tracking control signals is derived from adjacent guide tracks by the application of microwave energy to a capacitance detector or electrode which makes contact with the recording track, the difference between the tracking signals being taken to generate an error signal with which the magnetic head is controlled for positioning the magnetic head on the recording track.

Because of the grooveless guide track, the magnetic head is allowed to move laterally over several tracks to provide reproduction of motionless or slow-action pictures and contact wear is minimized or eliminated.

BRIEF DESCRIPTION OF THE DRAWINGS

The various features and advantages of the invention are readily apparent from the following description of the present invention which will proceed with reference to the accompanyng drawings, in which.

DETAILED DESCRIPTION

Figure 1:
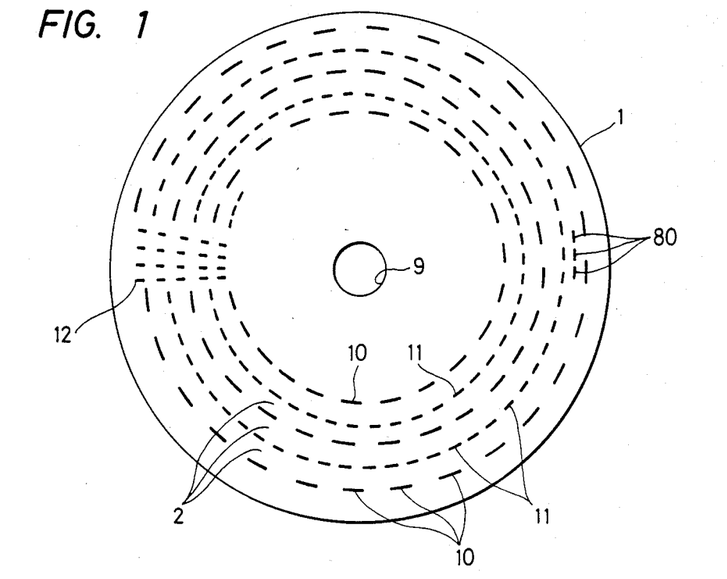
FIG. 1 is a plan view of a recording sheet disk of the present invention having a prerecorded guide pattern of minute pits.

Referring now to FIGS. 1 and 2, there is shown a novel disk record 1 of the present invention. The disk record 1 is of a sheet of approximately 100 micrometer thick and formed with a prerecorded spiral track comprising a series of alternately occurring part-spiral patterns of tracking signals schematically indicated at 10 and 11. Each of the tracking signal patterns 10 and 11 comprises a series of minute pits of different length and spacing in tangential direction from the correspoding length and spacing of the pits on the other tracking pattern so that they occur at different rates in spiral direction. Each tracking pattern is divided at 360-degree intervals by a track switching signal pattern 12 formed by a plurality of radially extending rows of minute pits whose function will be described later. The pits on each tracking pattern 10 have a greater tangential length and spacing than the pits on track patterns 11. As will be understood as the description will proceed a pair of tracking control signals of different frequencies will be generated from radially adjacent tracking patterns 10, 11 by means of a pickup head positioned between them. The tracking patterns 10 and 11 occur alternately in the radial direction with an interval sufficient to accommodate a spirally extending magnetic recording track 2 between them on which information signals will be magnetically recorded. In a preferred embodiment of the present invention, the tracking patterns have a width of 1 micrometer and are radially spaced apart by 1.5 to 2.0 micrometers. The length of pits and their spacing on track patterns 10 and 11 vary in a range from 10 to 100 micrometers as a function of distance from the outer perimeter of disk 1 so that the tracking control signals derived from patterns 10 and 11 are in the form of pulse trains of 50% duty ratio at frequencies of, typically, 150 kHz and 190 kHz, respectively. The sheet disk 1 is further formed with a center hole 9 for engaging with a drive spindle when in operation.

In FIG. 2, it is seen that the sheet disk 1 comprises a molded thermoplastic base 13. One particular material of the base 13 is polyethyleneterephthalate (PET), which is stamped into a sheet disk by a stamper having embossed track patterns of FIG. 1. Such stamper is molded from a master disk having the tracking patterns produced by irradiation of a laser beam. A ferromagnetic conductive layer 14 is deposited by vacuum evaporation technique on the base 13 so that the overlying layer follows the contour of the surface details of the underlying material. Suitable material for the ferromagnetic conductive layer 14 is a compound of iron, nickel and cobalt. On the conductive layer 14 is a dielectric layer which serves as a dielectric of a capacitor and as a protective coating. Polypropelene is found suitable for these purposes. Glow discharge polymerization technique is preferably employed for the deposition of the polypropelene layer 15, the deposition being continued until a thickness of 500 to 1000 Angstroms is attained.

The ferromagnetic conductive layer 14 serves the dual functions of a magnetic recording medium on which information signals are to be magnetically recorded and of a first or lower electrode of the capacitor the second electrode of which is provided by a capacitance detection stylus to be described later.

Figure 3:
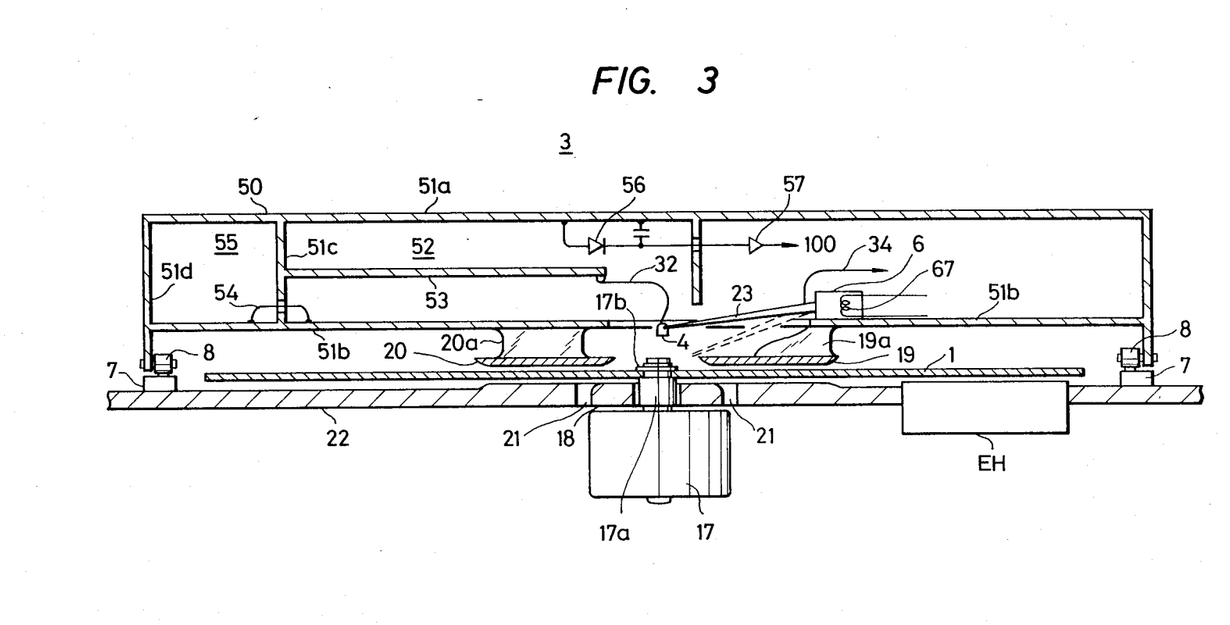
FIG. 3 is a cross-sectional view of a recording and/or playback system of the present invention.

FIG. 3 is an illustration of a recording and/or playback system generally indicated at 3 in which the disk record 1 is used. The system 3 comprises a chassis 22 on the underside of which is mounted a motor 17 that drives the sheet disk 1 at a speed, typically, of 1800 revolutions per minute. The motor 17 has its rotor shaft coupled with a spindle 17a which engages with the center hole 9 of disk 1. The recording medium 1 is clamped in position by a clamping nut 17b threadably engaged with the externally threaded portion of the spindle. A lower aerodynamic stabilizer 18 of an annular configuration is secured to the center of the chassis 22 so that its outer perimeter defines arcuate air passages 21 with the inner periphery of an opening in the chassis 22. The disk 1 is mounted slightly above the stabilizer 18 so that when disk 1 spins at high speed it drags the surrounding air in radially outward directions and produces an upward air current through the passages 21 producing a radially outwardly directed laminar airflow under the disk 1.

On the chassis 22 is a pair of guide rails 7, 7 on which is movably mounted a carriage 50 by rollers 8, 8, the carriage 50 being controllably moved by any appropriate means known in the art at a predetermined speed relationship with the rotational speed of the disk record 1. The carriage 50 may be any known design. This carriage 50 includes a UHF generator 55 which is defined by top wall 51a, bottom wall 51b and side walls 51c, 51d. The generator 55 generates 1 GHz UHF energy, which is coupled by a loop coupling 54 through an opening in the side wall 51c to a semi-coaxial resonator generally indicated at 52. The resonator 52 is comprised of an outer conductor defined by top and bottom walls 51a, 51b and side wall 51c, and an inner conductor 53 horizontally extending from the side wall 51c. A pair of upper aerodynamic stabilizers 19 and 20 is secured to the underside of bottom wall 51b by brackets 19a, 20a so that they are spaced a predetermined small distance above the disk 1 to produce a laminar airflow above the disk 1. The upper and lower laminar air currents act as air cushions which minimize or eliminate the tendency of the disk 1 to fluctuating in vertical directions.

On the right side of bottom wall 51b is mounted a pickup head drive mechanism 6 having a pivoted cantilever 23 and a pickup head mounted at the free end of the cantilever 23. As described in U.S. Pat. No.

4,160,268 granted to Goto et al, the lateral position of the cantilever 23 is controlled by a solenoid 67 located in the head drive mechanism 6 in response to tracking control signal. The cantilever 23 is also pivoted so as to swing vertically to move the pickup head 4 is in an upward position when the system is not operating and move to a downward position as indicated by broken lines in FIG. 3 for making resilient contact with the surface of disk 1 when the system is operating.

Figure 4:
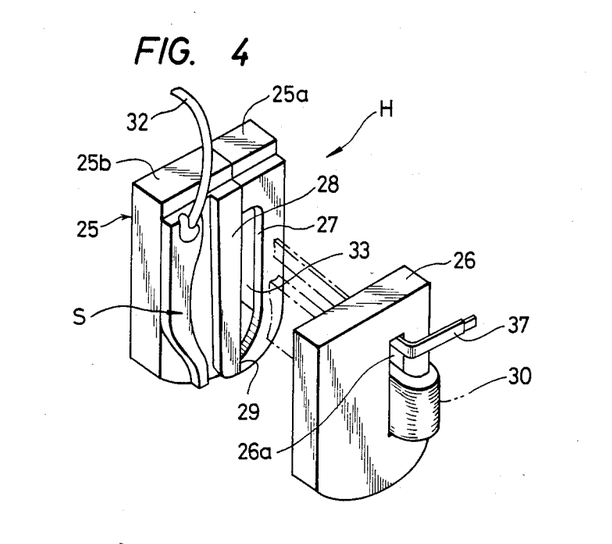
FIG. 4 is an exploded, perspective view of one example of the pickup head of the invention.

FIG. 4 illustrates the details of one example of the pickup head 4. The pickup head 4 comprises a capacitance detection stylus or electrode S and a magnetic transducer head H formed by core members 27 and 28 of a ferromagnetic material such as ferrite with a magnetic gap 29 between them. The electrode S and electromagnetic transducer H are arranged in side-by-side relation on a plane parallel to the direction of travel of the recording disk 1 and sandwiched between supporting members 25 and 26 of a wear resistant material such as glass or diamond. These supporting members provide a relatively wide contact area on their bottom for making as small a pressure contact as possible with the surface of the sheet disk 1. The support 25 is divided into a part 25a to which the core member 27 is secured and a part 25b to which the core member 28 and electrode S are secured, the parts 25a and 25b being cemented together with a spacer, not shown, to define the magnetic gap 29 with a high degree of precision. Connection is made to the stylus electrode S by a lead wire 32 from the inner conductor 53 of the sub-coaxial resonator 52 to generate a high frequency field between the electrode S and the ferromagnetic conductive layer 14 of disk 1 for the purpose of detecting the spirally formed track patterns as capacitance variations. A coil 30 is wound through aligned openings 26a and 33 on the core member 27, the output of the coil 30 being wound spirally along the cantilever 23 as illustrated in FIG. 5 to act as a trap coil to minimize the effect of the high frequency field.

Figure 5:
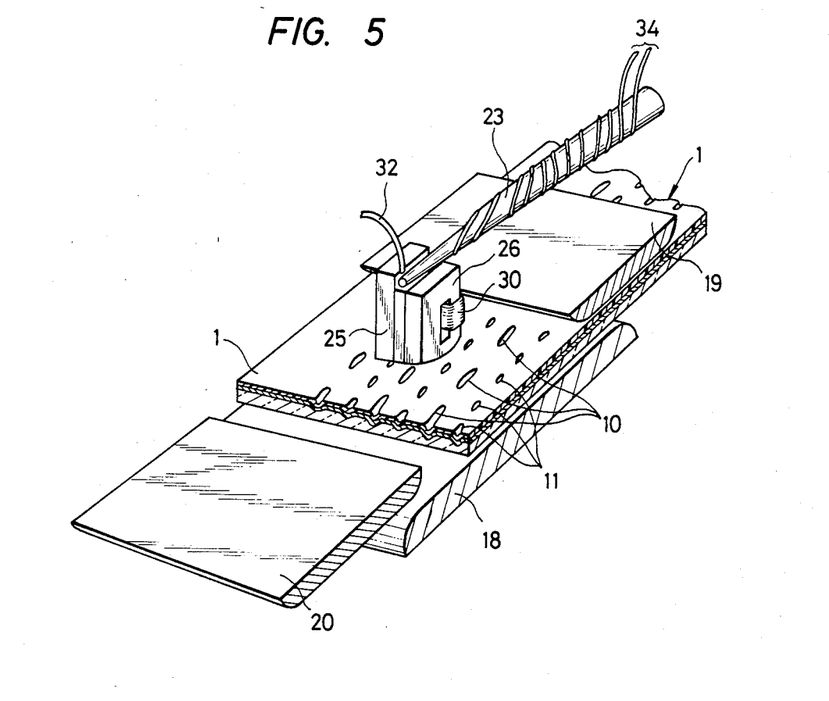
FIG. 5 is a perspective view illustrating the pickup head positioned on the recording medium of FIG. 1 spinning between upper and lower aerodynamic guides.

As seen in FIGS. 2 and 5, the stylus S and magnetic head H of pickup head 4, when controlled appropriately in response to tracking signals, will be centered on the magnetic track 2 between radially adjacent track patterns 10 and 11. This is accomplished as follows. The microwave energy transmitted from the resonator 52 to the stylus electrode S encounters a change in electrical property, or impedance, of the transmission line 32 as a result of the capacitance variations. Some of the energy is reflected from the electrode S in varying amount depending upon the amount of capacitance variations typically in a range of $10^{-3}$ to $10^{-2}$ picofarads which is $\frac{1}{2}$ to 1/5 of the maximum value of the capacitance formed between the electrode S and conductive layer 14. The microwave energy is thus modulated in amplitude with the capacitance variations that arise from the tracking patterns 10, 11 and track switching pattern 12. As a result, the amplitude-modulated energy varies at frequencies 150 kHz, 190 kHz and 400 kHz which are attributed respectively to the patterns 10, 11 and 12. It is seen that these prerecorded patterns 10, 11 and 12 serve as the sources of modulating signal on the 1 GHz microwave energy.

Figure 6A:
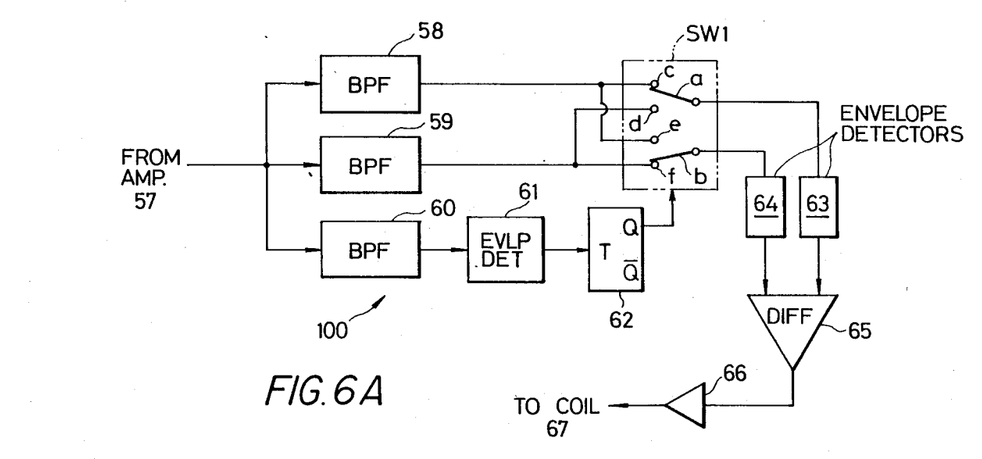
FIGS. 6A and 6B are a block diagram of a circuit for generating an error signal used to control the position of pickup head and a utilization circuit associated with the magnetic head, respectively.

The modulated microwave energy is coupled to a diode 56 where the modulating signals are obtained and fed through an amplifier 57 to a tracking control circuit (FIG. 6A).

The tracking control circuit 100 comprises band-pass filters 58, 59 and 60 having their inputs coupled together to the output of the amplifier 57. The band-pass filters 58 and 59 are used to separate the 150 kHz and 190 kHz tracking control signals from each other. The 150 kHz output of the band-pass filter 58 is applied to terminals c and e of a switch SW1 and the 190 kHz output of the band-pass filter 59 is applied to terminals d and f of the switch SW1. The switch SW1 has a pair of moving contacts a and b which are normally in contact with the terminals c and f to couple the outputs of band-pass filters 58 and 59 to envelope detectors 63 and 64, respectively, where the high frequency inputs are converted to DC signals representative of the amount of deviation of the stylus electrode S with respect to adjacent tracks 10 and 11. The difference between the two DC signals is taken by an error amplifier or differential amplifier 65, the difference output being fed through an amplifier 66 to the tracking control solenoid 67 to correct the lateral positon of the pickup head 4. The band-pass filter 60, on the other hand, is arranged to detect another frequency component of the demodulated signal which is derived in response to the track switching pattern 12, the output of filter 60 being coupled to an envelope detector 61 for DC conversion and applied as a switching signal to a T flip-flop 62. The flip-flop 62 stores the switching signal until the stylus S subsequently encounters the track switching pattern 12. The output of the flip-flop 62 is used to control the switch SW1. Since the track patterns 10 and 11 occur in alternate fashion, the moving contacts a and b of switch SW1 thus change their switch positions in step with the alternate occurrence of track patterns 10 and 11, so that each of the envelope detectors 63 and 64 always receives the same tracking control signal.

Figure 6B:
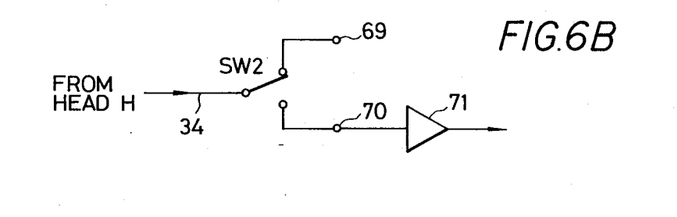

Magnetic recording is accomplished by applying a frequency-modulated video or audio signal to an input terminal 69 shown at FIG. 6B and thence through a record/playback changeover switch SW2 to the magnetic head H over the connecting leads 34. The frequency of the carrier for this frequency modulation is in a range from 1 MHz to 10 MHz which is much lower than the frequency used to sense the track patterns to avoid undesirable consequences of interference which might occur between the transducer H and stylus S.

It is to be noted that the intensity of the microwave energy at the tip of stylus S is much greater than the level of signal which might be induced therein by electromagnetic coupling with the transducer H. This prevents the induced information signal from modulating the microwave energy to a noticeable degree. In a preferred embodiment, the core members 27 and 28 of the transducer H are coupled to ground for further reducing the effect of such modulation.

In a practical embodiment, it is desirable to have the magnetic recording system to readily address to a desired portion of the recorded material. In this case an address code is prerecorded in the form of an additional series of minute pits on the ferromagnetic conductive layer 14 on the magnetic recording track 2 as indicated at 80 in FIG. 1. In video recording such address codes are preferably recorded during a retrace period of the television signal.

When the disk 1 is to be played, the switch SW2 is operated to couple the output signal of magnetic head H to a terminal 70 and thence to a playback amplifier 71.

In one embodiment of the invention the signals recorded along magnetic track 2 are erased by an erase head EH mounted on the chassis 22. The erase head EH, coupled to a suitable erasing signal source, extends radially from the perimeter of the disk 1 to the innermost magnetic track so that signals on the entire tracks are erased simultaneously by a single turn of the sheet disk 1.

Desired portion of the recorded material can also be selectively erased by incorporating an erase head into the pickup head 4. This is accomplished by winding a single turn of conductor 37 on the pickup head 4 through the aligned openings 26a and 33, as illustrated in FIG. 4, and connecting the conductor 37 to the erasing signal source.

Figure 7:
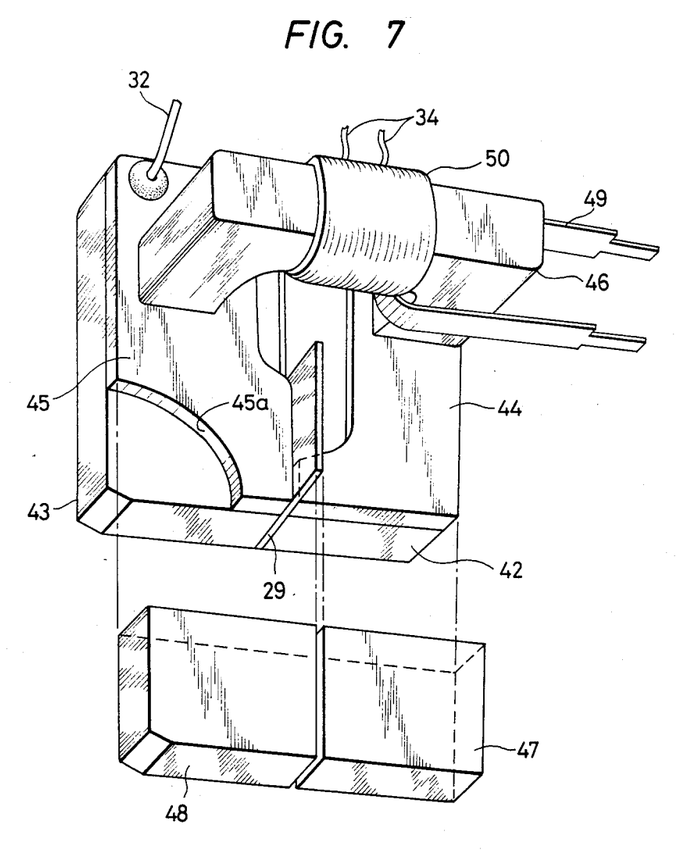
FIG. 7 is a perspective view of a modified form of the pickup head.

FIG. 7 is an illustration of another embodiment of the pickup head 4. This pickup head comprises a pair of glass supports 42 and 43 which are cemented together edgewise by means of a spacer 29. A first core member 44 of a relatively low conductivity ferromagnetic material such as ferrite and a second core member 45 of relatively high conductivity ferromagnetic material are cemented to the support members 42 and 43, respectively so that they form a magnetic gap 29 therebetween. One particular material of the high conductivity core member 45 is Sendust (a tradename) which is extensively used in high frequency applications. This core member 45a is formed with a recess 45 so that its lower portion is shaped into a form suitable for detecting track patterns 10, 11 and 12. Therefore, the core member 45 serves as a half core of the electromagnetic transducer H and as a stylus electrode S. For this purpose, the microwave energy coupling transmission line 32 is connected to the upper part of the core member 45. A ferrite core 46 of C-shaped configuration is cemented to the core members 44 and 45 to form a magnetic circuit, the web portion of the ferrite core 46 being wound with a coil 34 which is coupled to the recording and playback circuit. A single turn of conductor 49 is wound on a limb portion of the C-shaped core 46 to generate an erasing magnetic field across the magnetic gap 29. Glass supports 47 and 48 are cemented to the core members 44 and 45 respectively.

What is claimed is:

1. A pickup head for use with a recording medium having an underlying layer of ferromagnetic conductive meterial formed with a series of minute pits along each of a plurality of laterally spaced apart, first and second second guide tracks and a magnetic recording track therebetween, the minute pits on said first guide track being arranged to occur at a rate different from their rate of occurrence of those on the second guide track and overlying layer of a dielectric material, comprising:
    an electrode for acting upon said first and second guide tracks;
    means for coupling said electrode to a capacitance detection circuit;
    an electromagnetic transducer for contacting said magnetic recording track, said electrode and transducer being arranged on a common plane aligned with the magnetic recording track;
    means for coupling said transducer to an external utilization circuit; and
    a pair of identical wear resistant insulative supports between which said electrode and said transducer are secured, said supports defining with said electrode and transducer a contact face with which the pickup head contacts the surface of said recording medium when in use, said contact face having a width greater than the width of said magnetic recording track.

2. A pickup head as claimed in claim 1, wherein said transducer comprises core members and an insulative member secured therebetween to define a magnetic gap, and a coil for magnetically coupling said utilization circuit with said core members, and wherein one of said core members is connected in use by said electrode coupling means to said capacitance detection circuit to act as said electrode.

3. A pickup head as claimed in claim 2, wherein said electrode acting core member is formed of a higher conductivity ferromagnetic material than the conductivity of the other core member.

4. A system for recording signals on a recording medium having an underlying layer of a ferromagnetic material formed with a series of minute pits along each of a plurality of laterally spaced apart, first and second, guide tracks to define therebetween a magnetic recording track, the minute pits on said first guide track being arranged to occur at a rate different from the rate of occurrence of those on the second guide track; and an overlying layer of a dielectric material, comprising:
    means for moving said medium;
    a pickup head comprising an electrode for acting upon said first and second guide tracks by contact with the surface of said medium, an electromagnetic transducer for recording signals on said magnetic recording track, said electrode and transducer being arranged on a common plane aligned with the magnetic recording track and a pair of wear resistant identical supports between which said electrode and said transducer are secured, said supports defining with said electrode and transducer a contact face with which the pickup head contacts the surface of said recording medium, said contact face having a width greater than the width of said magnetic recording track;
    means for supplying ultrahigh frequency energy to said electrode and modulating the energy with capacitance variations which occur between said electrode and said recording medium at a rate corresponding to the rates of occurrence of said minute pits on said first and second guide tracks;
    means for coupling said transducer to an external utilization circuit;
    means for generating an error signal in response to said modulated ultrahigh frequency energy; and
    means for controlling the position of said pickup head laterally with respect to said magnetic recording track in response to said error signal,
    whereby signals are magnetically recorded on said magnetic recording track of said recording medium.

5. A system as claimed in claim 4, wherein said first and second guide tracks are of part-spiral configuration so that said magnetic recording track is of a spiral pattern, and wherein said recording medium is further formed with a plurality of radially extending rows of minute pits at 360 degree intervals whereby said ultrahigh frequency energy is further modulated with capacitance variations corresponding to said minute pits of said rows,
    tracking signal generating means for deriving from said modulated ultrahigh frequency energy first and second signals at the modulating frequencies of said ultrahigh frequency energy and generating therefrom a tracking control signal representative of the difference in magnitude between said first and second signals; and wherein said tracking signal generating means further comprises means for deriving a switching control signal from the modulated ultrahigh frequency energy, a differential amplifier responsive to said first and second signals for generating a difference output, and means for switching said first and second signals prior to application to said differential amplifier in response to said switching control signal.

6. A system as claimed in claim 4, wherein said pickup head is supported on a cantilever, and wherein said coupling means includes a pair of wires connected from said transducer to said utilization circuit, said wires being spirally wound on said cantilever to act as a trap coil for said ultrahigh frequency energy.

7. A system for reproducing signals from a recording medium having an underlying layer of a ferromagnetic material formed with a series of minute pits along each of a plurality of laterally spaced apart, first and second, guide tracks to define therebetween a magnetic recording track, the minute pits on said first guide track being arranged to occur at a rate different from the rate of occurrence of those on the second guide track; and an overlying layer of a dielectric material, comprising:

means for moving said medium;

a pickup head comprising an electrode for acting upon said first and second guide tracks by contact with the surface of said medium, an electromagnetic transducer for reproducing signals from said magnetic recording track, said electrode and transducer being arranged on a common plane aligned with the magnetic recording track and a pair of wear resistant identical supports between which said electrode and said transducer are secured, said supports defining with said electrode and transducer a contact face with which the pickup head contacts the surface of said recording medium, said contact face having a width greater than the width of said magnetic recording track;

means for supplying ultrahigh frequency energy to said electrode and modulating the energy with capacitance variations which occur between said electrode and said recording medium at a rate corresponding to the rates of occurrence of said minute pits on said first and second guide tracks;

means for coupling said transducer to an external utilization circuit;

means for generating an error signal in response to said modulated ultrahigh frequency energy; and means for controlling the position of said pickup head laterally with respect to said magnetic recording track in response to said error signal, whereby signals are magnetically reproduced from said magnetic recording track of said recording medium.

* * * * *